US010894292B2

(12) United States Patent
Maehara et al.

(10) Patent No.: US 10,894,292 B2
(45) Date of Patent: Jan. 19, 2021

(54) MACHINE TOOL

(71) Applicants: CITIZEN WATCH CO., LTD., Nishitokyo (JP); CITIZEN MACHINERY CO., LTD., Nagano (JP)

(72) Inventors: Tomonori Maehara, Tokorozawa (JP); Tadayasu Shida, Hannou (JP); Yohichi Kataoka, Kawagoe (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 42 days.

(21) Appl. No.: 16/328,460

(22) PCT Filed: Jun. 19, 2017

(86) PCT No.: PCT/JP2017/022471
§ 371 (c)(1),
(2) Date: Feb. 26, 2019

(87) PCT Pub. No.: WO2018/042832
PCT Pub. Date: Mar. 8, 2018

(65) Prior Publication Data
US 2020/0206820 A1 Jul. 2, 2020

(30) Foreign Application Priority Data

Aug. 31, 2016 (JP) .................................. 2016-170350
Sep. 7, 2016 (JP) .................................. 2016-174600

(51) Int. Cl.
*B23B 3/16* (2006.01)
*B23B 29/24* (2006.01)
*B23B 3/06* (2006.01)

(52) U.S. Cl.
CPC ................ *B23B 3/16* (2013.01); *B23B 29/24* (2013.01); *B23B 3/065* (2013.01); *Y10T 29/5168* (2015.01);
(Continued)

(58) Field of Classification Search
CPC ........... B23B 3/065; B23B 3/16; B23B 25/04; B23B 29/24; Y10T 29/5168;
(Continued)

(56) References Cited

U.S. PATENT DOCUMENTS 4,955,119 A * 9/1990 Bonomi .................... B21J 15/10
227/58
5,564,171 A 10/1996 Ozawa et al.
(Continued)

FOREIGN PATENT DOCUMENTS

EP 0 613 745 A1 9/1994
EP 1 321 212 A1 6/2003
(Continued)

OTHER PUBLICATIONS

Extended European Search Report; Application No. 17845842.8; dated Mar. 3, 2020; 7 pages.
(Continued)

*Primary Examiner* — Sunil K Singh
*Assistant Examiner* — Michael Vitale
(74) *Attorney, Agent, or Firm* — Knobbe, Martens, Olson & Bear, LLP

(57) ABSTRACT

A machine tool includes a main spindle movably supported in an axial direction, and two gang tool posts disposed opposed to each other with an axis of the main spindle located therebetween. Each of the two gang tool posts is supported movably in X and Y directions that are perpendicular to the axial direction of the main spindle. Each of the two gang tool posts is provided with tools arranged parallel
(Continued)

to each other in the Y direction. One of the two gang tool posts is movably disposed in a Z direction that is a same direction as the axial direction of the main spindle. Any one of the two gang tool posts is integrally provided with a turning tool base that turnably supports tools about a Y-axis along the Y direction.

6 Claims, 5 Drawing Sheets

(52) U.S. Cl.
CPC ........ *Y10T 29/5173* (2015.01); *Y10T 82/2543* (2015.01)

(58) Field of Classification Search
CPC ............. Y10T 29/5173; Y10T 29/5174; Y10T 82/16442; Y10T 82/16622; Y10T 82/16655; Y10T 82/2543
USPC .............. 29/50, 54, 55; 82/70.2, 81, 83, 138
See application file for complete search history.

(56) References Cited

U.S. PATENT DOCUMENTS

| | | | | |
|---|---|---|---|---|
| 6,928,909 | B1 * | 8/2005 | Akimoto | B23B 3/065 29/27 C |
| 7,954,216 | B2 * | 6/2011 | Sturm | B27M 3/08 29/26 A |
| 8,244,396 | B2 * | 8/2012 | Terai | B23Q 39/021 700/192 |
| 2004/0176229 | A1 | 9/2004 | Soroka et al. | |
| 2005/0217442 | A1 | 10/2005 | Akimoto et al. | |
| 2008/0110307 | A1 * | 5/2008 | Kong | B23Q 39/026 82/124 |
| 2013/0244846 | A1 * | 9/2013 | Koch | B23Q 3/06 483/16 |
| 2016/0256932 | A1 * | 9/2016 | Theurillat | B23B 11/00 |
| 2017/0072473 | A1 | 3/2017 | Kawasumi | |

FOREIGN PATENT DOCUMENTS

| | | |
|---|---|---|
| JP | 4-365501 A | 12/1992 |
| JP | 6-246508 A | 9/1994 |
| JP | 10-015702 A | 1/1998 |
| JP | 2001-129701 A | 5/2001 |
| JP | 2001-198701 A | 7/2001 |
| JP | 2003-080403 A | 3/2003 |
| JP | 4-997240 B2 | 8/2012 |
| JP | 2016-036868 A | 3/2016 |
| WO | WO 2002/024386 A1 | 3/2002 |
| WO | WO 2008/013313 A1 | 1/2008 |
| WO | WO 2016/021212 A1 | 2/2016 |

OTHER PUBLICATIONS

Office Action issued in Japanese Patent Application No. 2016-174600, dated Jun. 30, 2020.

* cited by examiner

MACHINE TOOL

CROSS-REFERENCE TO RELATED APPLICATION

This application is a national stage application of PCT Application No. PCT/JP2017/022471, filed on Jun. 19, 2017, which claims priority to Japanese Patent Application No. 2016-170350, filed on Aug. 31, 2016, and Japanese Patent Application No. 2016-174600, filed on Sep. 7, 2016, the entire disclosures of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a machine tool.

BACKGROUND ART

Conventionally, a machine tool including a main spindle and two tool posts is known in the art. The main spindle is supported to move in an axis direction, and the tool posts are arranged opposite to each other with the axis the main spindle therebetween. Each of the two tool posts is supported to move in Y-axis and X-axis directions perpendicular to the axis direction of the main spindle. The machine tool is configured so that tools are arranged parallel to each other in the Y-axis direction. One of the two tool posts is arranged to move in a Z-axis direction which is the same direction as the axis direction of the main spindle (see Patent Literature 1: JP2001-129701A (page 5, FIG. 1) for example).

Further, a machine tool including a turning tool base which is supported to turn about the Y-axis is known in the art (see Patent Literature 2: JP4997240B (page 6, FIG. 4), for example).

SUMMARY

An object of the present disclosure is to provide a machine tool which includes a tool post having a tooth comb shape or a gang tool post in which tools arranged in a Y-axis direction parallel to each other and can perform a wide variety of machining in multiple manners with a simple configuration.

A machine tool according to the present disclosure to solve the above issues includes a main spindle movably supported in an axial direction, and two gang tool posts disposed opposed to each other with an axis (axis line) of the main spindle located therebetween, wherein each of the two gang tool posts is supported movably in X and Y directions that are perpendicular to the axial direction of the main spindle, and each of the two gang tool posts is provided with tools that are arranged in the Y direction parallel to each other, wherein one of the two gang tool posts is movably disposed in a Z direction that is a same direction as the axial direction of the main spindle, and wherein any one of the two gang tool posts is integrally provided with a turning tool base that turnably supports tools about a Y-axis along the Y direction.

The machine tool according to the present disclosure is characterized in that an end surface tool base is disposed on a side of the gang tool post integrally provided with the turning tool base to move together with the gang tool post.

The machine tool according to the present disclosure is characterized in that the turning tool base is provided on a side of one of the gang tool posts, and the end surface tool base is provided on a side of the other of the gang tool posts.

The machine tool according to the present disclosure is characterized in that the turning tool base is disposed on a side of the gang tool post that is fixed in the Z direction.

The machine tool according to the present disclosure further comprising a second main spindle disposed opposed to the main spindle, and a second main spindle tool base disposed opposed to the turning tool base with an axis of the main spindle located therebetween, the second main spindle tool base attached with tools for machining a material held by the second main spindle.

The machine tool according to the present disclosure is characterized in that the main spindle is arranged so that the axis of the main spindle extends along a left-right direction, and the gang tool posts are respectively disposed on a front side and a rear side with the axis of the main spindle located therebetween so that the gang tool post movable in the Z direction is disposed on a rear side opposed to a work area for an operator located on a front side of a machine.

DETAILED DESCRIPTION

Figure 1:
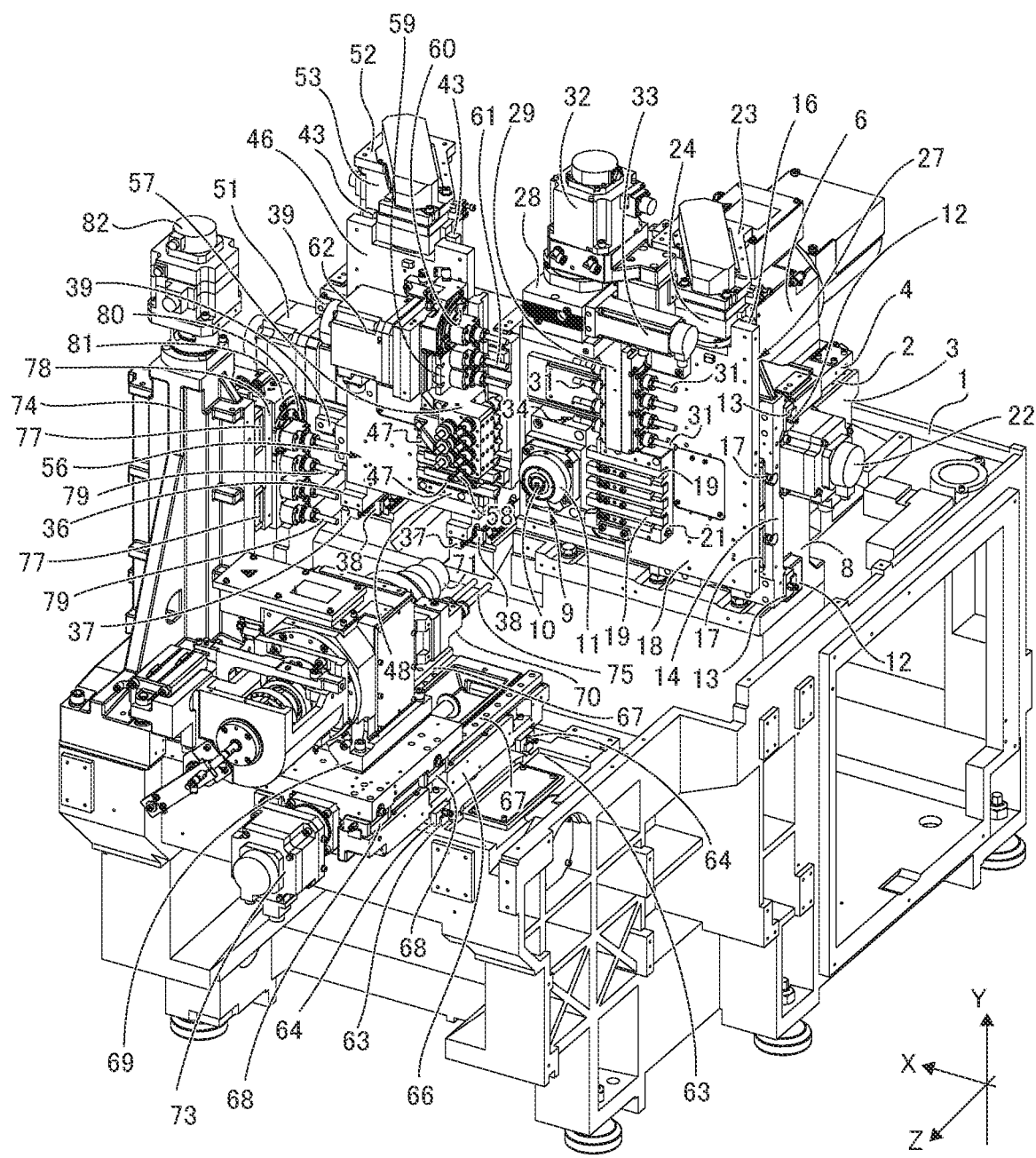
FIG. 1 is a perspective view illustrating an automatic lathe as one embodiment of a machine tool of the present disclosure.
Figure 2:
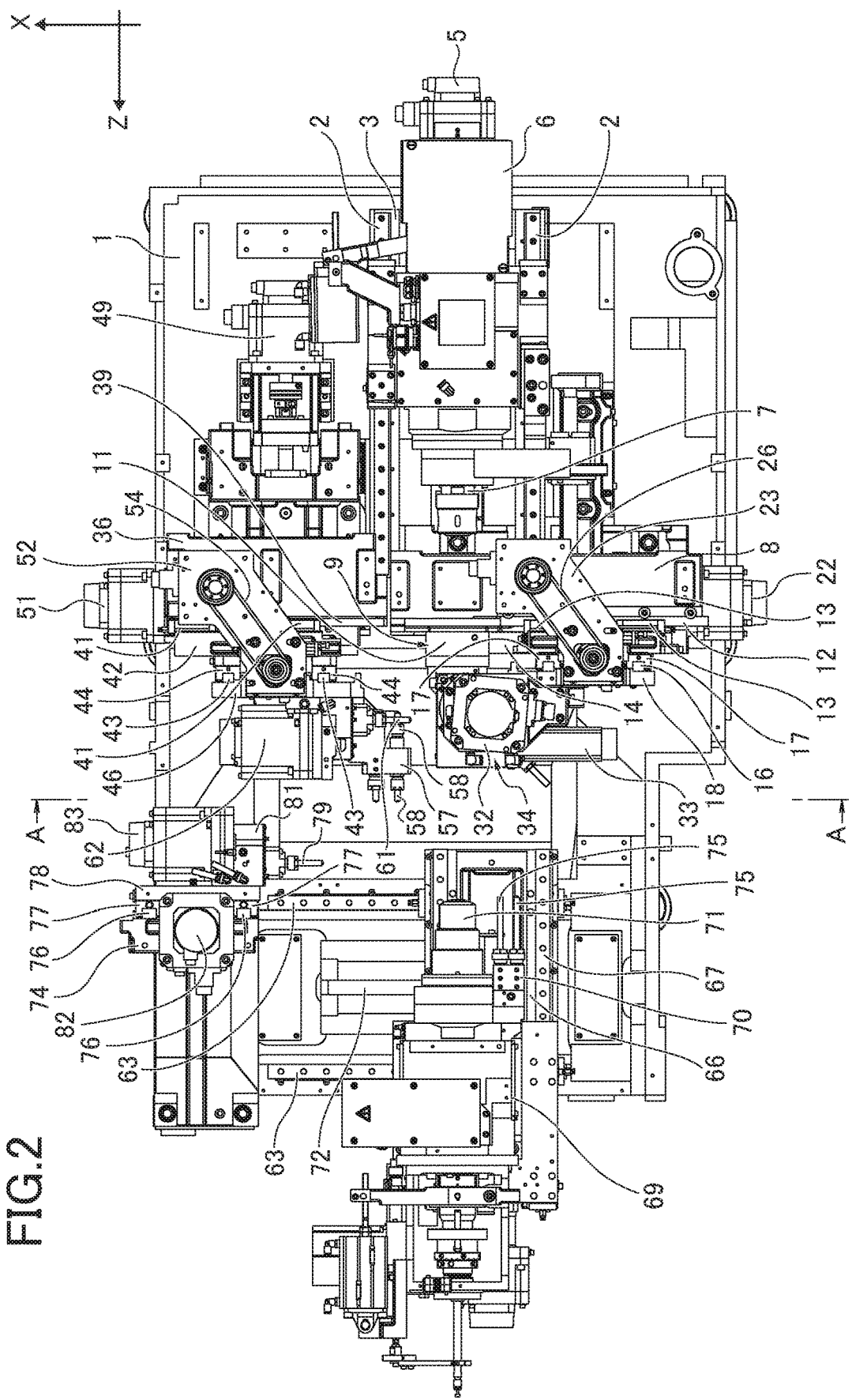
FIG. 2 is a plan view of the automatic lathe illustrated in FIG. 1.
Figure 3:
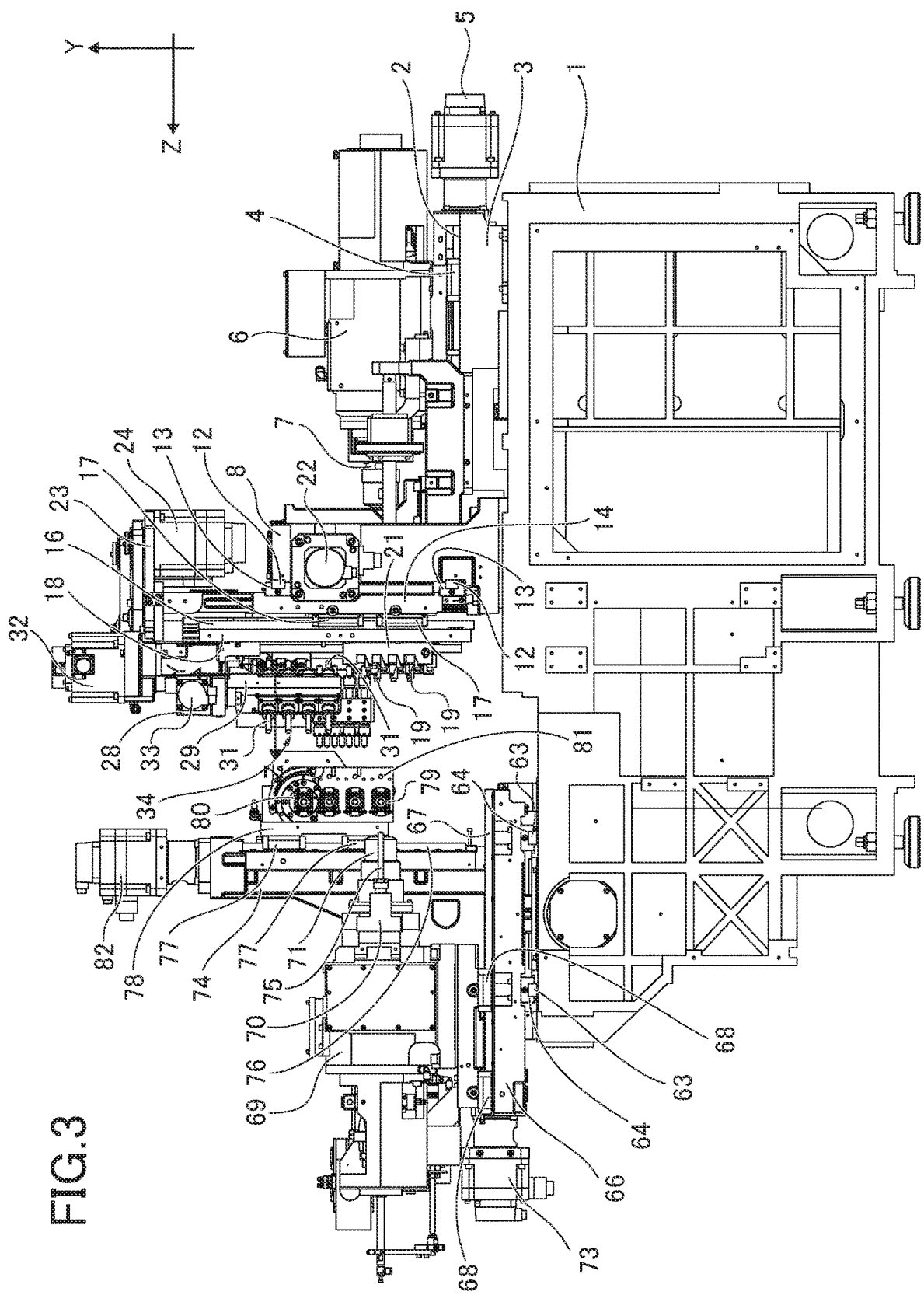
FIG. 3 is a front view of the automatic lathe illustrated in FIG. 1.
Figure 4:
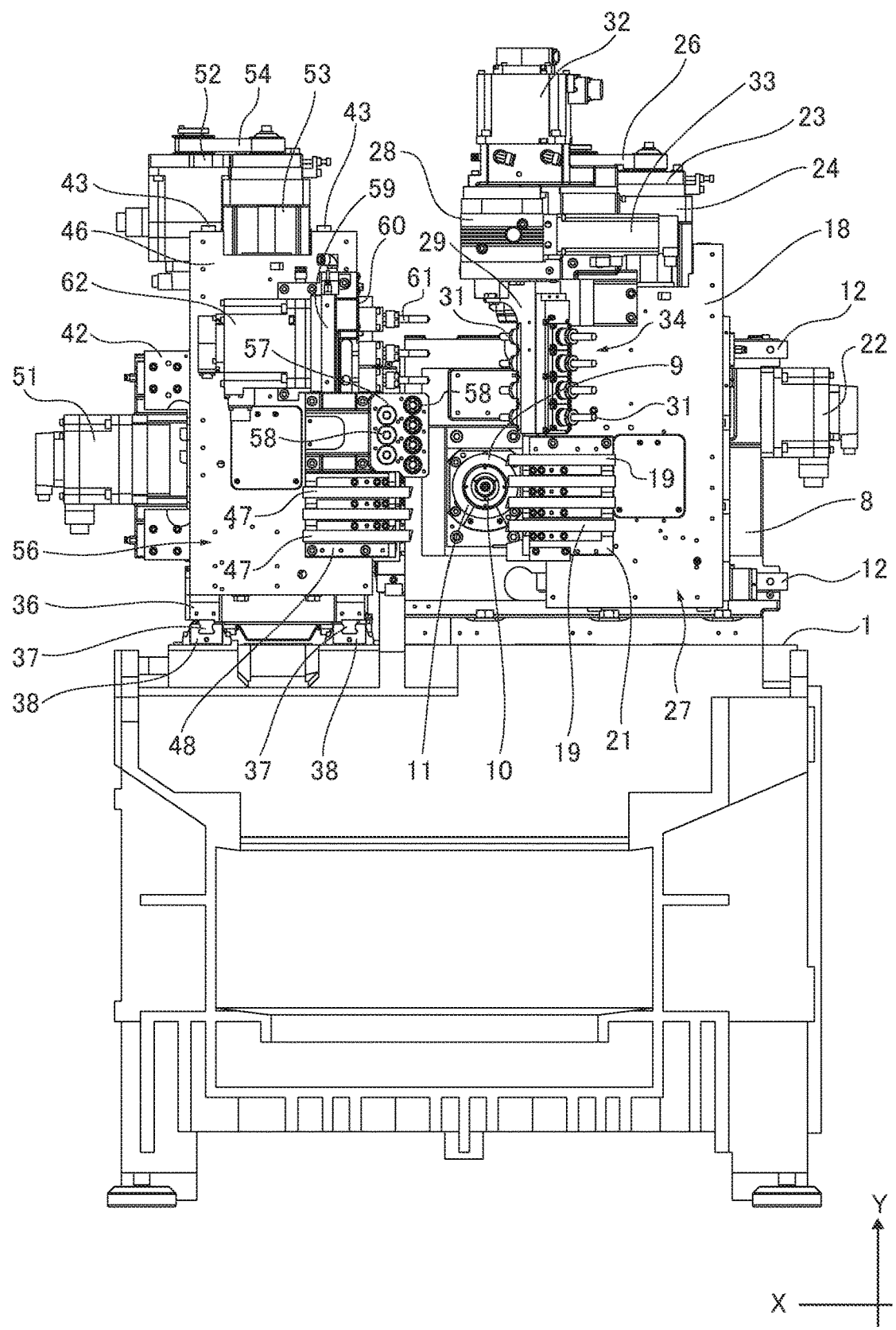
FIG. 4 is a cross-sectional view along a line A-A shown in FIG. 2.

FIGS. 1 to 4 show an automatic lathe, which is an embodiment of a machine tool according to the present disclosure.

The automatic lathe includes Z1 slide rails 2 on a bed 1. The Z1 slide rails 2 extend in a Z direction corresponding to a left and right direction in a plan view. The Z1 slide rails 2 are fixed to a Z1 guide block 3 which is fixed to the bed 1. Two Z1 slide rails 2 are arranged in a X direction to be parallel to each other. The X direction corresponds to a front and rear direction in the plan view and is perpendicular to the Z direction.

A saddle 4 is slidably attached to the Z1 slide rails 2. A first headstock 6 is integrally attached to the saddle 4. A first main spindle 7 is rotatably supported by the first headstock 6. The first main spindle 7 is arranged so that its axis extends in the Z direction. A Z1 motor 5 is fixed to the Z1 guide block 3.

The Z1 motor 5 rotatably drives a ball screw of a ball screw mechanism which engages the first headstock 6 between the Z1 slide rails. The drive by the Z1 motor 5 allows the first main spindle 7 to slide in the Z direction through the first headstock 6. The automatic lathe is right handed. That is, a position where one can see the first main spindle 7 on the right side is the forward (front) of the automatic lathe, and the work area for an operator is located in the front of the automatic lathe.

A support post 8 is disposed on the left side of the Z1 slide rails 2 and fixed to the bed 1. A guide bush unit 9 is fixed to the support post 8. The guide bush unit 9 includes a guide bush 10 and a guide bush holder 11 which receives the guide bush 10. The guide bush unit 9 is disposed so that the axis of the guide bush 10 is coincident with the axis of the first main spindle 7. The guide bush holder 11 is fixed to the support post 8. The guide bush 10 is located on the left side of the first main spindle 7.

X1 slide rails 12 are fixed to the support post 8 and extend in the X direction. Two X1 slide rails 12 are arranged in the Y direction to be parallel to each other. The Y direction is perpendicular to the X direction and the Z direction in a vertical direction. A saddle 13 is slidably attached to the X1 slide rails 12. A X1 moving base 14 is integrally attached to the saddle 13. Note that the X direction, the Y direction, and the Z direction are perpendicular to each other.

A saddle 17 is slidably attached to Y1 slide rails 16 extending in the Y direction and is integrally fixed to the X1 moving base 14. The Y1 slide rails 16 are integrally fixed to a first slide base 18. A first tool holder 21 is integrally fixed to the first slide base 18 and tools 19 for machining are attached to the first tool holder 21. The first tool holder 21 allows each of the tools 19 to be arranged in the Y direction.

A X1 motor 22 is fixed to the support post 8. The X1 motor 22 rotatably drives a ball screw of a ball screw mechanism which engages the X1 moving base 14 between the X1 slide rails 12. A Y1 motor 24 is fixed to the upper surface of the first slide base 18 via a motor attachment plate 23.

The Y1 motor 24 rotatably drives via a belt 26 a ball screw of a ball screw mechanism which engages the first slide base 18 between the Y1 slide rails 16. The X1 motor 22 allows the first slide base 18 to slide in the X direction and the Y1 motor 24 allows the first slide base 18 to slide in the Y direction.

Fixing the first tool holder 21 to the first slide base 18 forms a first tool post having a tooth comb shape or a first gang tool post 27. In the first gang tool post 27, the tools 19 are arranged in the Y direction. The first gang tool post 27 can be slid in the X and Y directions by the X1 motor 22 and the Y1 motor 24. The first gang tool post 27 is disposed in front of the axis of the first main spindle 7 and slidably moved in an area forward of the axis of the first main spindle 7.

Figure 5:
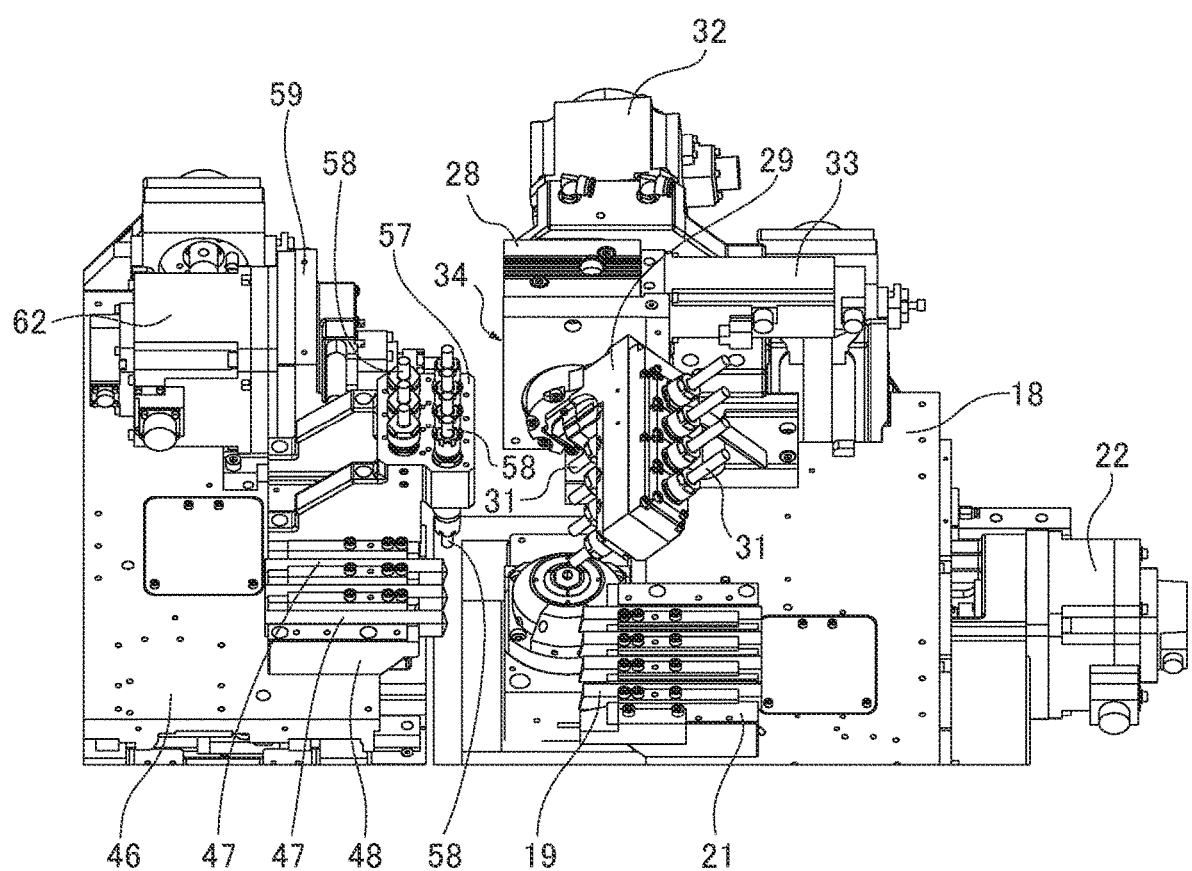
FIG. 5 is a perspective view illustrating a turning tool base.

As shown in FIG. 5, a rotating tool base 28 is integrally fixed to the first slide base 18 at a position above the first tool holder 21. A first rotating tool platform 29 is attached to the rotating tool base 28 so as to rotate about the Y-axis along the Y direction. The first rotating tool platform 29 has a substantially inverted L-shape and extends in the Y direction. The first rotating tool platform 29 is configured to arrange a plurality of rotary tools 31 in the Y direction. The rotary tools 31 such as drills, end mills and the like can be attached to the first rotating tool platform 29 to extend in left and right directions.

A S3 rotary tool motor 32 is mounted on the upper surface of the rotating tool base 28. The S3 rotary tool motor 32 rotates the rotary tools 31 attached to the first rotating tool platform 29. The first rotating tool platform 29 rotatably drives the rotary tools 31 attached to the first rotating tool platform 29 by the S3 rotary tool motor 32 via a rotary drive mechanism provided therewithin.

A B1 motor 33 is disposed on the right side of the rotating tool base 28. The first rotating tool platform 29 is driven and turned by the B1 motor 33 via a turning drive mechanism provided between the rotating tool base 28 and the first rotating tool platform 29. The first rotating tool platform 29 is turnably supported by the rotating tool base 28 so that a turning tool base 34 is formed.

The turning tool base 34 is integrally attached to the first gang tool post 27 by the fact that the rotating tool base 28 is fixed to the first slide base 18. The rotary tools 31 attached to the turning tool base 34 integrally turn about the Y-axis (the Y direction) by the first rotating tool platform 29, which is the so called B-axis turning.

A Z2 moving base 36 is disposed behind of the first main spindle 7. Z2 slide rails 37 extending in the Z direction are disposed on the bottom surface of the Z2 moving base 36. Two Z2 slide rails 37 are arranged in the X direction parallel to each other. A saddle 38 is slidably attached to the Z2 slide rails 37. The saddle 38 is fixed to the bed 1 behind the first main spindle 7.

X2 slide rails 39 are fixed to the Z2 moving base 36 and extend in the X direction. Two X2 slide rails 39 are arranged in the Y direction parallel to each other. A saddle 41 is slidably attached to the X2 slide rails 39. A X2 moving base 42 is integrally attached to the saddle 41. A saddle 44 is slidably mounted on Y2 slide rail S43 extending in the Y direction and is integrally attached to the X2 moving base 42.

The Y2 slide rails S43 are integrally fixed to a second slide base 46. A second tool holder 48 is integrally fixed to the second slide base 46. Tools 47 for machining are attached to the second tool holder 48. The second tool holder 48 allows the tools 47 to be arranged in the Y direction. A Z2 motor 49 is fixed to the bed 1.

The Z2 motor 49 rotatably drives a ball screw of a ball screw mechanism which engages the Z2 moving base 36 between the Z2 slide rails 37. The Z2 moving base 36 can be slid in the Z direction by the Z2 motor 49. A X2 motor 51 is fixed to the Z2 moving base 36. The X2 motor 51 rotatably drives a ball screw of a ball screw mechanism which engages the X2 moving base 42 between the X2 slide rails 39.

A Y2 motor 53 is fixed to the upper surface of the second slide base 46 via a motor attachment plate 52. The Y2 motor 53 rotatably derives via a belt 54 a ball screw of a ball screw mechanism which engages the second slide base 46 between the Y2 slide railS43. The second slide base 46 can be slid in the X direction by the X2 motor 51 and in the Y direction by the Y2 motor 53.

The second tool holder 48 is fixed to the second slide base 46 to form a second gang tool post 56. In the second gang tool post 56, the tools 47 are arranged in the Y direction. The second gang tool post 56 can be slid in the X direction, the Y direction and the Z direction by the X2 motor 51, the Y2 motor 53, and the Z2 motor 49, respectively. The second gang tool post 56 is disposed on the rear side behind the axis of the first main spindle 7 and slides in an area behind the axis of the first main spindle 7. The first gang tool post 27 and the second gang tool post 56 are disposed opposed to each other in the front and rear direction with the axis (axis line) of the first main spindle 7 therebetween.

An end surface tool base 57 is integrally fixed to the second slide base 46 at a position above the second tool holder 48. Drilling tools 58 such as drills and the like are fixedly attached to the end surface tool base 57 and arranged in the X and Y directions. The drilling tools 58 can be attached to the end surface tool base 57 to extend to the right and left directions.

A second rotating tool platform 59 is integrally fixed to the second slide base 46 at a position above the end surface tool base 57. The second rotating tool platform 59 extends in the Y direction, and allows a plurality of rotary tools 61 such as drills and end mills to be arranged in the Y direction. A S4 rotary tool motor 62 is attached to the second rotating tool platform 59. A S4 rotary tool motor 62 rotatably drives the rotary tools 61 attached to the second rotating tool platform 59.

The second rotating tool platform 59 rotatably drives the rotary tools 61 attached to the second rotating tool platform 59 by the S4 rotary tool motor 62 via a rotary drive mechanism provided therewithin. A tool attachment portion 60 is located at the top of the second rotating tool platform 59 and attached to turn about the X direction. The tool attachment portion 60 can be positioned and fixed at a predetermined turning angle by manually adjusting the turning angle from the front side.

X3 slide rails 63 extending in the X direction are fixed to the bed 1 on the left side of the support post 8. Two X3 slide rails 63 are arranged in the Z direction to be parallel to each other. A saddle 64 is slidably mounted on the X3 slide rails 63. A X3 moving base 66 is integrally attached to the saddle 64. Z3 slide rails 67 extending in the Z direction are integrally fixed to the X3 moving base 66.

Two Z3 slide rails 67 are arranged in the X direction to be parallel to each other. A saddle 68 is slidably mounted on the Z3 slide rails 67. A second headstock 69 is integrally attached to the saddle 68. The second headstock 69 rotatably supports a second main spindle 71. The second main spindle 71 is arranged such that the axis of the spindle extends along the Z direction.

A ball screw mechanism is fixed to the bed 1 and a ball screw 72 of the ball screw mechanism engages the X3 moving base 66 between the X3 slide rails 63. A motor and the like rotatably drives the ball screw 72 so that the X3 moving base 66 slides in the X direction. A Z3 motor 73 is fixed to the X3 moving base 66.

The Z3 motor 73 rotatably derives a ball screw of a ball screw mechanism which engages the second headstock 69 between the Z3 slide rails 67. The Z3 motor 73 drives the second headstock 69 to slide in the Z direction. The Z3 motor 73 and a motor for driving the ball screw 72 drive the second main spindle 71 in the X direction and the Z direction.

A opposite tool post 70 is integrally fixed to the second headstock 69 and attached with the tool 75 for machining at the first main spindle 7. The tool 75 can be attached to the opposite tool post 70 in the Z direction. The opposite tool post 70 slides in the X direction and the Z direction together with the second main spindle 71.

A second support post 74 is provided behind the X3 slide rails 63 on the bed 1 and extends in the Y direction. Y3 slide rails 76 extending in the Y direction are integrally fixed to the second support post 74. Two Y3 slide rails 76 are arranged in the X direction parallel to each other. A saddle 77 is slidably mounted on the Y3 slide rails 76. A Y3 moving base 78 is integrally attached to the saddle 77.

A second main spindle tool base 81 is integrally fixed to the Y3 moving base 78. The second main spindle tool base 81 are attached with tools 79 for machining at the second main spindle 71. A Y3 motor 82 is fixed to the second support post 74. The Y3 motor 82 rotatably rotates a ball screw of a ball screw mechanism which engages the Y3 moving base 78 between the Y3 slide rails 76.

The Y3 motor 82 drives the Y3 moving base 78 to slide in the Y direction. The second main spindle tool base 81 in this embodiment is configured to arrange the tools 79 in the Y direction. The second main spindle tool base 81 is integrally attached with a S5 rotary tool motor 83 for rotatably driving the tools 79.

The rotary tools such as drills, end mills and the like can be attached to the second main spindle tool base 81 as the tools 79. The second main spindle tool base 81 rotatably drives the rotary tools attached to the second main spindle tool base 81 by the S5 rotary tool motor 83 via a rotary drive mechanism provided therewithin. A tool attachment portion 80 is disposed at the top of the second main spindle tool base 81 to turn about the X direction. The tool attachment portion 80 can be positioned and fixed at a predetermined turning angle by manually adjusting the turning angle from the front side.

An elongate rod material can be inserted into the first main spindle 7 as a material from the back of the first main spindle 7. The rod material inserted into the first main spindle 7 extends from the guide bush 10 and is held or gripped by the first main spindle 7. The rod material held by the first main spindle 7 rotates by rotationally driving the first main spindle 7.

By moving the first main spindle 7 relative to the rotating rod material in the Z direction and moving the first gang tool post 27 in the X and Y directions, the tools 19 attached to the first tool holder 21 are selected and then the selected tools 19 perform machining to a portion of the rod material extending from the guide bush 10.

By fixing or rotatably driving the rod material, turning the turning tool base 34, moving the first main spindle 7 in the Z direction, and moving the first gang tool post 27 in the X and Y directions, the predetermined rotary tools 31 attached to the turning tool base 34 are selected, and then the selected rotary tools 31 perform machining to the rod material (i.e. the tools perform the B-axis machining).

By moving the second gang tool post 56 relative to the rotating rod material in the X direction, the Y direction and the Z direction, the tools attached to the second tool holder 48, the end surface tool base 57, and/or the second rotating tool platform 59 are selected, and then the selected tools can perform machining to a portions of the rod material extending from the guide bush 10. For example, by attaching the rotary tools 61 to the tool attachment portion 60 of the second rotating tool platform 59 in a direction crossing a turning center axis via an attachment and the like, machining can be performed by the rotary tools 61 attached by turning at a predetermined angle.

Machining by each tool provided in the second gang tool post 56 can be performed independently from machining each tool provided in the first gang tool post 27 behind the rod materials opposed to each other with the axis of the first main spindle 7 between the rod materials relative to machining by each tool provided in the first gang tool post 27.

For example, since the second gang tool post 56 is movable in the Z direction, by making the second gang tool post 56 follow or pursue the movement of the first main spindle 7 in the Z direction in accordance with machining by each tool provided in the first gang tool post 27 for example, machining by each tool provided in the first gang tool post 27 and machining by each tool provided in the second gang tool post 56 can be simultaneously performed.

By sliding the opposite tool post 70 in the X and Z directions together with the second main spindle 71 to select a predetermined tool 75, the selected predetermined tool 75 can perform machining to the rod material held by the first main spindle 7. Machining by the rotary tools 75 attached to the opposite tool post 70 can be simultaneously performed with machining by each tool provided in the first gang tool post 27 and machining by each tool provided in the second gang tool post 56 by making the opposite tool post 70 follow or pursue the movement of the first main spindle 7.

After finishing the machining for one product at the rod material held by the first main spindle 7, the second headstock 69 moves in the X direction so that the axis of the second main spindle 71 is coincident with the axis of the first main spindle 7, and accordingly, a cut-off portion of the rod material can be provided to the second main spindle 71 as a material. By moving the second main spindle 71 in the X and Y directions, and moving the second main spindle tool base 81 in the Y direction to select the tools 79 attached to the second main spindle tool base 81, the selected predetermined the tools 79 can perform machining to the material held by the second main spindle 71.

At this time, by attaching the tools 79 to the tool attachment portion 80 of the second main spindle tool base 81 in a direction crossing the turning central axis via an attachment and the like, for example, machining can be performed by the tools 79 attached by turning at a predetermined angle.

By fixing or rotatably driving the second main spindle 71, moving the second main spindle 71 in the X and Z directions, moving the first gang tool post 27 in the X and Y directions, and turning the turning tool base 34 to select the predetermined rotary tools 31 attached to the turning tool base 34, the selected rotary tools 31 can perform the so-called B-axis machining to the material held by the second main spindle 71.

By moving the second main spindle 71 in the X and Z directions, and moving the second gang tool post 56 in the X, Y and Z directions relative to the material held by the second main spindle 71 to select the tool attached to the second gang tool post 56, the selected tool can perform machining to the material held by the second main spindle 71.

Machining at the first main spindle 7 and machining at the second main spindle 71 can be independently performed by the first gang tool post 27 moving in the X and Y directions, and the second gang tool post 56 moving in the X, Y and Z directions independent from the first gang tool post 27.

In addition, since the turning tool base 34 and the end surface tool base 57 are separately disposed on the first gang tool post 27 and the second gang tool post 56 which independently move in the X and Y directions, and the second gang tool post 56 is movable in the Z direction, by making the second gang tool post 56 follow or pursue the movement of the second main spindle 71 in the Z direction in accordance with the B-axis machining performed by the rotary tools 31, which are attached to the turning tool base 34, relative to the material held by the second main spindle 71, the material can also be machined by each of tools provided in the second gang tool post 56.

The invention claimed is:

1. A machine tool comprising:
   a main spindle movably supported in an axial direction thereof,
   a second main spindle disposed opposed to the main spindle, and
   two gang tool posts disposed opposed to each other with an axis of the main spindle therebetween,
   wherein each of the two gang tool posts is supported movably in X and Y directions that are perpendicular to the axial direction of the main spindle, and each of the two gang tool posts is provided with tools that are arranged in the Y direction parallel to each other,
   wherein one of the two gang tool posts is movably disposed in a Z direction that is a same direction as the axial direction of the main spindle such that the Z direction is parallel to the axial direction,
   wherein the one of the two gang tool posts movably disposed in the Z direction is provided with an end surface tool base that moves together therewith, and
   wherein an other gang tool post of the two gang tool posts is immovable in the Z direction and integrally provided with a turning tool base that turnably supports tools about a Y-axis along the Y direction.

2. The machine tool according to claim 1, further comprising
   a second main spindle tool base disposed opposed to the turning tool base with the axis of the main spindle located therebetween, the second main spindle tool base attached with tools for machining a material held by the second main spindle.

3. The machine tool according to claim 1,
   wherein the two gang tool posts are respectively disposed on a front side and a rear side of the machine tool with the axis of the main spindle therebetween so that the one of the two gang tool posts movable in the Z direction is disposed on the rear side opposed to a work area for an operator on the front side of the machine tool.

4. A machine tool comprising:
   a main spindle movably supported in an axial direction thereof,
   a second main spindle disposed opposed to the main spindle,
   a first gang tool post and a second tool post disposed opposed to each other with an axis of the main spindle therebetween, wherein the first and second gang tool posts are supported movably in X and Y directions that are perpendicular to the axial direction of the main spindle, and comprise tools that are arranged in the Y direction parallel to each other, and wherein the first gang tool post is movably disposed in a Z direction and the second gang tool post is immovable in the Z direction, the Z direction being a same direction as the axial direction of the main spindle and parallel to the axial direction of the main spindle,
   an end surface tool base disposed on the first gang tool post to move together with the first gang tool post, and
   a turning tool base integrally disposed on the second gang tool post to turnably support tools about a Y-axis along the Y direction.

5. The machine tool according to claim 4, further comprising
   a second main spindle tool base disposed opposed to the turning tool base with the axis of the main spindle located therebetween, the second main spindle tool base attached with tools for machining a material held by the second main spindle.

6. The machine tool according to claim 4,
   wherein the first and second gang tool posts are arranged in the X direction with the axis of the main spindle therebetween,
   wherein the second gang tool post is disposed on a front side of the machine tool next to a work area for an operator, and the first gang tool post is disposed on a rear side of the machine tool opposed to the work area.

\* \* \* \* \*